(No Model.)
J. TULLIUS.
MOTIVE POWER FOR BICYCLES OR SIMILAR MACHINES.
No. 530,911. Patented Dec. 11, 1894.
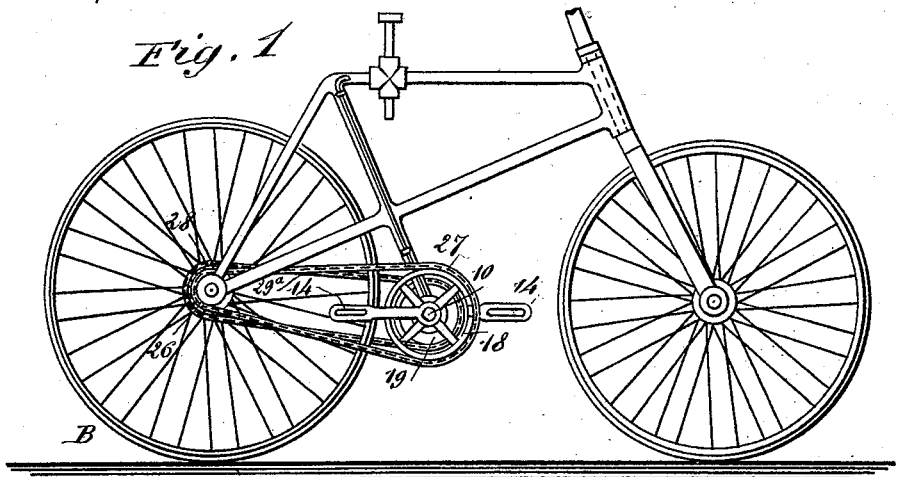
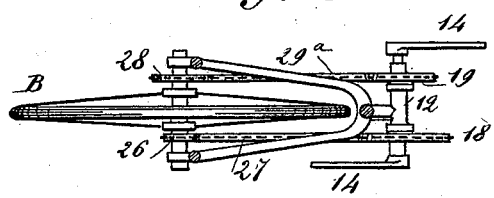
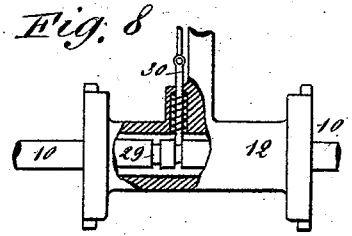
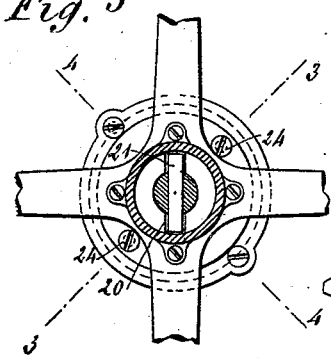
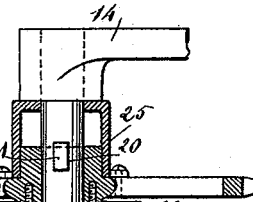
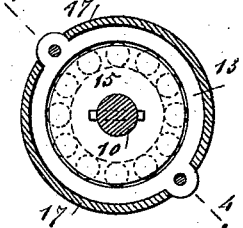
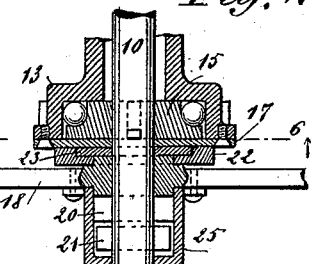
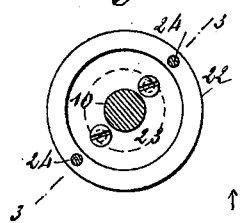
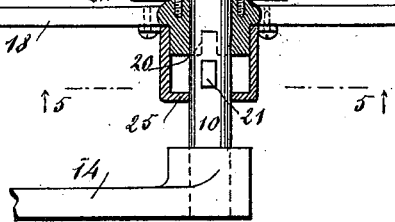
WITNESSES:
C. Neveux
C. Sedgwick
INVENTOR
J. Tullius
BY
Munn & Co
ATTORNEYS.

UNITED STATES PATENT OFFICE.

JULIUS TULLIUS, OF NEW YORK, N. Y.

MOTIVE POWER FOR BICYCLES OR SIMILAR MACHINES.

SPECIFICATION forming part of Letters Patent No. 530,911, dated December 11, 1894.

Application filed May 18, 1892. Serial No. 433,414. (No model.)

*To all whom it may concern:*

Be it known that I, JULIUS TULLIUS, of New York city, in the county and State of New York, have invented a new and Improved Motive Power for Bicycles or Similar Machines, of which the following is a full, clear, and exact description.

My invention relates to an improvement in the motive power of bicycles, tricycles or like machines, and has for its object to provide simple and durable mechanism whereby the pedal shaft may be actuated to attain speed or actuated to attain a maximum of power; and it is a further object of the invention to provide in connection with the pedal shaft a shifting mechanism which will enable a rider, while traveling, to expeditiously and conveniently change for speed or for power as the character of the ground over which the vehicle is traveling may require.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a side view of a bicycle having the improvement applied thereto. Fig. 2 is a plan view of the power attachment, illustrating its attachment to the pedal shaft and a wheel. Fig. 3 is a horizontal section through the casing, boxings, &c., through which the pedal shaft passes, the section being essentially on line 3—3 of Fig. 5. Fig. 4 is a detail sectional view on line 4 of Figs. 5 and 6. Fig. 5 is a section on line 5—5 of Fig. 3. Fig. 6 is a section on line 6—6 of Fig. 3. Fig. 7 is a section on line 7—7 of Fig. 3, and Fig. 8 is a detail view, illustrating a latch applied to the pedal shaft.

The pedal shaft 10, is held to revolve in a bearing sleeve 12, which sleeve at each end has formed integral therewith a cup section 13 of a ball bearing A. The pedal shaft extends some distance beyond the bearing sleeve 12, which sleeve, in fact, is located around the central portion of the pedal shaft, and the shaft is free to revolve therein. The pedal shaft is provided with the usual crank arms 14, adapted for the reception of pedals.

In the construction of the ball bearings A, a socket plate 15, is introduced into the cup section, which socket plate is splined upon the shaft, as illustrated in Fig. 6, and consequently turns with it. This socket section of the bearing carries the balls, as shown in Fig. 3, and they are held to operate in engagement with both the cup and socket sections. The socket section is held within the cup section of the bearing by a cap plate 16, which plate is screwed upon the outer face of the cup section in such a manner as to maintain the socket section in place, and as the balls wear, by tightening this plate 16 a perfect bearing is at all times maintained.

The plate 16, may be provided with a marginal flange 17, shown most clearly in Fig. 3, if in practice it is found desirable, which is adapted when used to surround the peripheral surface of the cup section. It will be understood that the pedal shaft turns loosely in the plates 16 of the bearings A.

Outside of the bearings A the pedal shaft carries two gears 18 and 19, one of which is considerably larger than the other. These gears are loosely mounted upon the shaft, or upon bearings carried by the shaft, and the front or outer faces of their hubs have diametrical slots 20, produced therein, adapted to be carried in engagement with keys 21, located upon the shaft and preferably so placed as to be removable therefrom, as shown in Fig. 3; and when the hub of one wheel is in engagement with a key, for instance at the right-hand end of the shaft the hub of the wheel at the left-hand end will be out of engagement with the key at that end, so that one wheel will at all times turn with the shaft and the other loosely upon the shaft or the bearings carried by the shaft.

The inner face of each wheel hub has a ring 22 in suitable connection therewith, as shown in Figs. 3, 4 and 7, the ring being loosely mounted upon the hub and held in place by a tie-plate 23 secured to the hub of the wheel. When the gear wheels 18 and 19, are placed upon the pedal shaft, or upon bearings carried by the shaft, the rings 22, are attached to the outer face plates of the ball bearings by means of screws, or otherwise, and in this manner the gear wheels are held in engagement with the bearings, yet are free to turn, although the bearings are stationary. It will be observed that there is nothing to prevent the movement of the pedal shaft, and by pressing upon either the right or left crank arm with the foot, the operator may carry the shaft either to the right or to the left, and cause either one of the gear wheels 18 or 19 to revolve with the shaft, and the wheel so revolving will constitute the drive wheel of the machine.

It is very desirable that the pedal shaft should be held in whatever position it is placed by the operator, or locked in that position. Therefore the pedal shaft, at or near its center, is provided with two adjacent peripheral grooves, or channels 29, shown in Figs. 3 and 8; and upon that portion of the frame engaging with the sleeve 12, in which the pedal shaft has movement, a latch 30, is located, the said latch being spring-controlled, and it extends downward through the sleeve and into either one of the pedal-shaft grooves 29, as shown in Fig. 8. This latch can be readily operated by the rider, as it may be provided with a rod, wire or cord, extending upward within easy reach of the seat. This latch, while exceedingly simple will effectually hold the pedal shaft in the position in which it has been placed by the operator either for speed or for power. Dust caps 25, are loosely mounted upon the shaft, covering the keys 21, the said dust caps being preferably secured to the outer faces of the hubs of the gears.

The rear wheel B of the bicycle is provided with a gear wheel at opposite sides of its hub and firmly secured thereto. Upon one side of the hub a small wheel 26, is secured, which is connected by a belt 27 with the larger wheel 18 upon the pedal shaft; and a larger wheel 28, is secured to the opposite side of the hub of the rear wheel of the machine, which is connected by a belt 29ª with the smaller wheel 19 upon the pedal shaft. The gears employed are preferably sprocket wheels and the belts chain belts. Thus it will be observed that when the pedal shaft is thrown in locking engagement with the larger sprocket wheel 18 the machine will be in condition for speeding; but should a stretch of heavy ground be reached, by pushing the shaft in such a manner as to throw it out of engagement with the large sprocket wheel 18 and into engagement with the smaller wheel 19, less speed will be obtained but considerably more power will result. Thus it is obvious that by the simple contrivance above set forth, and a side movement of the feet upon the pedals, the machine, while running, may be thrown into gear for speed or for power, as may be deemed most advisable.

Having thus described my invention, I claim as new and desire to secure by Letters Patent—

1. In a driving mechanism for bicycles, the combination with a bearing sleeve having cupped ends, and a sliding pedal shaft projecting through the sleeve, of socket plates fitting in the cupped ends of the sleeve and secured to the said shaft, balls in the bearings formed by the cupped ends and socket plates and gear wheels of different sizes loosely mounted on the pedal shaft and loosely connected with the ends of the sleeve, substantially as described.

2. In a driving mechanism for bicycles, the combination with a bearing sleeve having cupped ends, and a sliding pedal shaft in the sleeve, of socket plates fitting in the cupped ends of the sleeve and secured to the shaft, balls in the bearings formed by the cupped ends and socket plates gear wheels of different mesh loosely mounted on the pedal shaft, and rings mounted loosely on the hubs of the wheel and connected with the ends of the sleeve, substantially as described.

3. In a driving mechanism for bicycles, the combination with a bearing sleeve having cupped ends, and a sliding pedal shaft therein, of socket plates fitting in the cupped ends of the sleeve and splined to the pedal shaft, balls in the bearing formed by the cupped ends of the sleeves and the socket plates, plates secured to the cupped ends of the sleeve for holding the socket plates in position, gear wheels loose on the pedal shaft, and rings mounted loosely on the hubs of the gear wheels, and connected with the plates which hold the socket plates in position, substantially as herein shown and described.

4. In a driving mechanism for bicycles, the combination with a sleeve having cupped ends, and a pedal shaft sliding in said sleeve, of socket plates fitting in the cupped ends of the sleeve, balls in the bearings formed by the said cupped ends and socket plates, gear wheels of different mesh loosely mounted on the pedal shaft, rings mounted loosely on the hubs of the wheels and connected with the ends of the sleeve, and clutches for alternately locking the gear wheels to the pedal shaft, substantially as herein shown and described.

JULIUS TULLIUS.

Witnesses:
M. BRUCKHEIMER,
M. J. MCLAUGHLIN.